United States Patent [19]
Bradford et al.

[11] 3,970,777
[45] July 20, 1976

[54] APPARATUS FOR ADJUSTING VIDEO PEDESTAL AND PEAK WHITE LEVEL

[75] Inventors: Robert S. Bradford, Woodland Hills; Peter Amass, Camarillo, both of Calif.

[73] Assignee: Minnesota Mining and Manufacturing Company, St. Paul, Minn.

[22] Filed: June 9, 1975

[21] Appl. No.: 585,102

[52] U.S. Cl. ............................ 178/7.1; 178/DIG. 26
[51] Int. Cl.² ........................................ H04N 5/16
[58] Field of Search .................. 178/7.1, DIG. 26

[56] References Cited
UNITED STATES PATENTS
3,700,794  10/1972  Loose .................................. 178/7.1

*Primary Examiner*—Robert L. Richardson
*Attorney, Agent, or Firm*—Alexander, Sell, Steldt & DeLaHunt

[57] ABSTRACT

A video compensation network is disclosed in which the pedestal level and the peak white level of a composite video signal are automatically maintained within predetermined limits. The network includes two digital/feedback loops for independently detecting and generating correction signals which are used to control the respective pedestal and peak white levels. The feedback loops are activated to make incremental adjustments to the two levels once per video field.

17 Claims, 4 Drawing Figures

APPARATUS FOR ADJUSTING VIDEO PEDESTAL AND PEAK WHITE LEVEL

BACKGROUND OF THE INVENTION

1. Field of the Invention

This invention relates to video signal processing circuits wherein automatic control of the gain and pedestal levels are provided.

2. Description of the Prior Art

Appropriate video standards have been established for sync amplitude, pedestal height and peak white and black excursions in order to ensure compatibility and uniformity in the television industry. Video signals such as those produced by video cameras are generally adjusted to comply with these standards during the camera "set-up" procedure. However, for various reasons, the resultant composite signal may not conform to those standards due to varying light conditions, scene contrast, etc. For example, the video cameras may be "remoted" such that manual adjustments or readjustments cannot be made. Under such conditions, if the signals produced by the cameras are directly recorded and subsequently reproduced upon playback, the reproduced signals may not conform to designated standards. Reproduced signals corresponding to such improperly reproduced information must be further processed to provide the requisite signal parameters. Accordingly, it has become useful to provide means for processing the signal to restore these parameters to the standard values.

Although a simple gain control circuit can adjust the entire composite video signal such that the maximum excursion, i.e., the sync pulse amplitude or maximum carrier level, is normalized to a desired level, more complex circuits are required to independently adjust the pedestal height and the amplitude of the active video excursions. Furthermore, since a change in the pedestal level results in a change in the peak white level, and vice versa, some way to compensate for such interactions must be provided.

It has become common practice to continuously provide such adjustments to the pedestral height and video excursions by analog feedback techniques. In such practices, the pedestral height variation is attained by inserting a pedestal correction signal during the active video period (during unblanking) while the video excursions are controlled by an automatic gain control loop. The appropriate peak black and peak white levels are detected, compared with the desired levels and the resultant error signals are used to control the appropriate adjustments. The interaction of the two feedback loops is often overcome by designing the response time of the automatic pedestal adjustment loop to be significantly slower than that of the automatic gain control (AGC) loop.

However, such analog control loops are incapable of providing adequate control in certain situations. For example, significant changes to both the pedestal level and the video level can occur within a single field. Thus, if the response time of the respective loops is designed to be sufficiently slow so that "shading" occurring within a few fields is minimized, then the corresponding automatic control functions are so slowed down as to appreciably reduce the usefulness of the device. Similarly, a sudden reduction in the video level from bright to dark will cause the AGC action to drive the dynamic range of the video excursions to full level, thereby resulting in a nonuniform contrast during that field. Such control loops are also incapable of providing a fixed gain over an indefinite period, i.e., to "freeze" the gain where it is.

In contrast to such analog feedback control loops, a variety of digital feedback loops for controlling video signal levels are also known. In U.S. Pat. No. 3,790,706 (Gubala), an automatic video contrast control circuit is disclosed in which the peak white and peak black portions of the picture information portion of a composite video signal are detected (the black and white detectors being disabled during blanking intervals) and are used to ensure that the video signal within a given field is expanded to provide a uniform and maximum contrast between these two levels. To so do, the picture information portion of the video signal is digitized and the difference between the peak white and peak black is divided across a voltage divider network to control each digitized portion of the video signal. However, such a system fails to provide any corrective adjustment of the pedestal level.

U.S. Pat. No. 3,670,100 (Briggs and Ward) discloses a system for automatically establishing voltage levels in a camera output signal. In this system, the output level is sensed and compared with a reference signal to establish a digital signal indicative of whether the sensed signal is greater or less than the reference. The digital signal is then converted to a corresponding analog signal and fed back to control the output signal. The digital comparator is preferably activated once per field. No provision is made for allowing signals within a prescribed range to remain unchanged, nor is there any suggestion for independently adjusting both the pedestal level and the peak white level.

SUMMARY OF THE INVENTION

In contrast to the prior art devices, the present invention provides independent digital feedback controls to enable automatic adjustment of the pedestal level and the peak white level of a composite video signal. Each of the independently adjusted portions of the composite video signals are incrementally adjusted once each video field, i.e., in response to a vertical sync pulse. The invention thus provides the advantage over prior art systems in that the pedestal level and the automatic gain control action is frozen during a given video field, thereby preventing changes occurring within a single field from altering the signal levels during that field.

The video compensation network of the present invention includes a pedestal adjustment circuit having a feedback loop for processing a composite video signal to automatically maintain the pedestal level of a thus processed composite video signal at a desired pedestal level and a video gain adjustment circuit having a feedback loop for automatically maintaining the peak white level of the processed composite video signal at a desired level. In the present invention, the pedestal adjustment circuit includes a circuit for detecting the pedestal level of the processed video signal, and a comparator network activated by a vertical blanking signal associated with the received composite video signal for comparing the detected pedestal level with a desired pedestal level. The comparator network produces a digital pedestal control signal which is adjusted not more than one increment each video field. The pedestral control signal is in turn processed to produce a first feedback signal corresponding to the pedestal control signal. The pedestal adjustment circuit further comprises a summing network for combining the first feedback signal together with a received composite video signal to produce as the processed video signal a stripped video signal having zero pedestal level and a peak black level at approximately ground potential.

The video gain adjustment circuit of the present invention includes a detector circuit for detecting the peak white level of the processed video signal together with a comparator network activated by the vertical blanking signal for comparing the detected peak white level with a desired peak white level. A digital gain control signal is thus produced, which signal is adjusted not more than one increment each video field and which is further processed to produce a second feedback signal corresponding to the gain control signal. The video gain adjustment circuit further comprises a summing network for combining the second feedback signal together with the processed video signal such that the maximum excursion of the processed signal is automatically maintained within a predetermined range.

The video compensation network of the present invention further comprises a pedestal reinsertion network for adding blanking pulses having a predetermined amplitude to the automatically maintained processed video signal to provide a compensated composite video signal in which the pedestal level and video gain may each be independently automatically adjusted upon each vertical blanking pulse.

Preferably, additional controls are provided for selectively interrupting the automatic adjustments such that the pedestal level and video gain may be indefinitely frozen at the automatically adjusted level.

BRIEF DESCRIPTION OF THE DRAWING

FIG. 3 is shown in two sheets, labeled FIGS. 3A and 3B.

DESCRIPTION OF THE PREFERRED EMBODIMENTS

Figure 1:
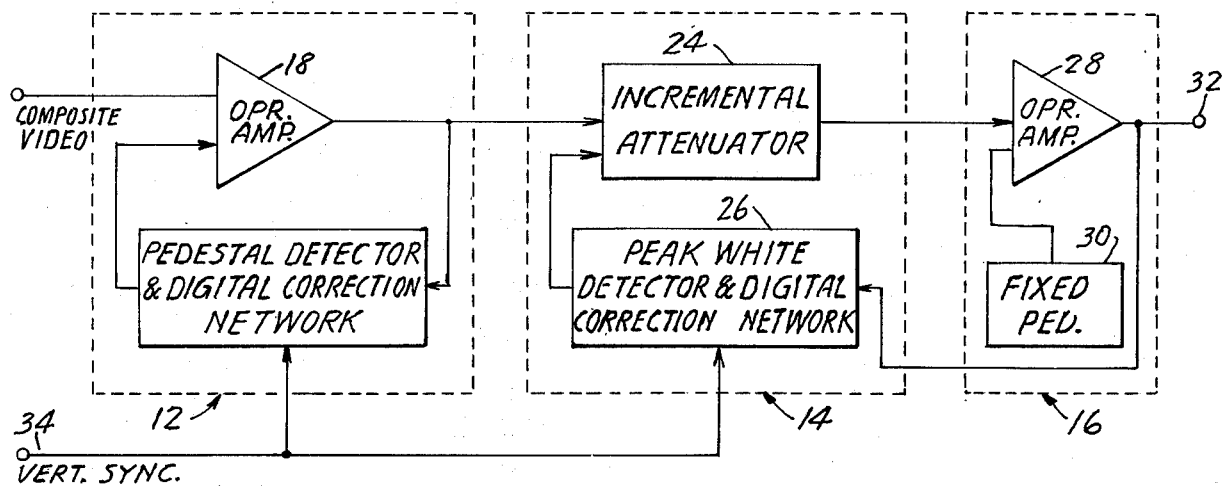
FIG. 1 is an abbreviated block diagram of the video compensation network according to the present invention.

In FIG. 1, the video compensation network of the present invention is shown to comprise a pedestal adjustment circuit 12, a video gain adjustment circuit 14, and a pedestal reinsertion circuit 16. The pedestal adjustment circuit 12 includes an operational amplifier 18 and a pedestal detector and digital correction network 20. The network 20 is coupled in a feedback loop between the output and an input to the operational amplifier 18 to thereby maintain the pedestal level of a processed composite video signal at the output of the operational amplifier 18 at a predetermined level. The output from the operational amplifier 18 is coupled to the video gain adjustment circuit 14. This circuit 14 includes an incremental attenuator 24 and a peak white detector and digital correction network 26. The network 26 is coupled in a feedback loop between the output of the pedestal reinsertion circuit 16 and the input to the incremental attenuator 24 such that the peak white level and the inserted pedestal of a video signal provided at the output 32 are maintained at a desired level. The output of the incremental attenuator 24 is coupled to the pedestal reinsertion circuit 16, which circuit includes a summation network 28 for adding together the output from the incremental attenuator 24 together with a signal provided by a fixed pedestal circuit 30 to provide at the output 32 a compensated composite video signal in which the pedestal level and the video gain are each independently and automatically adjusted. The pedestal adjustment circuit 12 and the video gain adjustment network 14 are each activated by a vertical sync signal provided at terminal 34 such that the adjustments to the respective portions of an incoming composite video signal are made once each video field.

Figure 2:
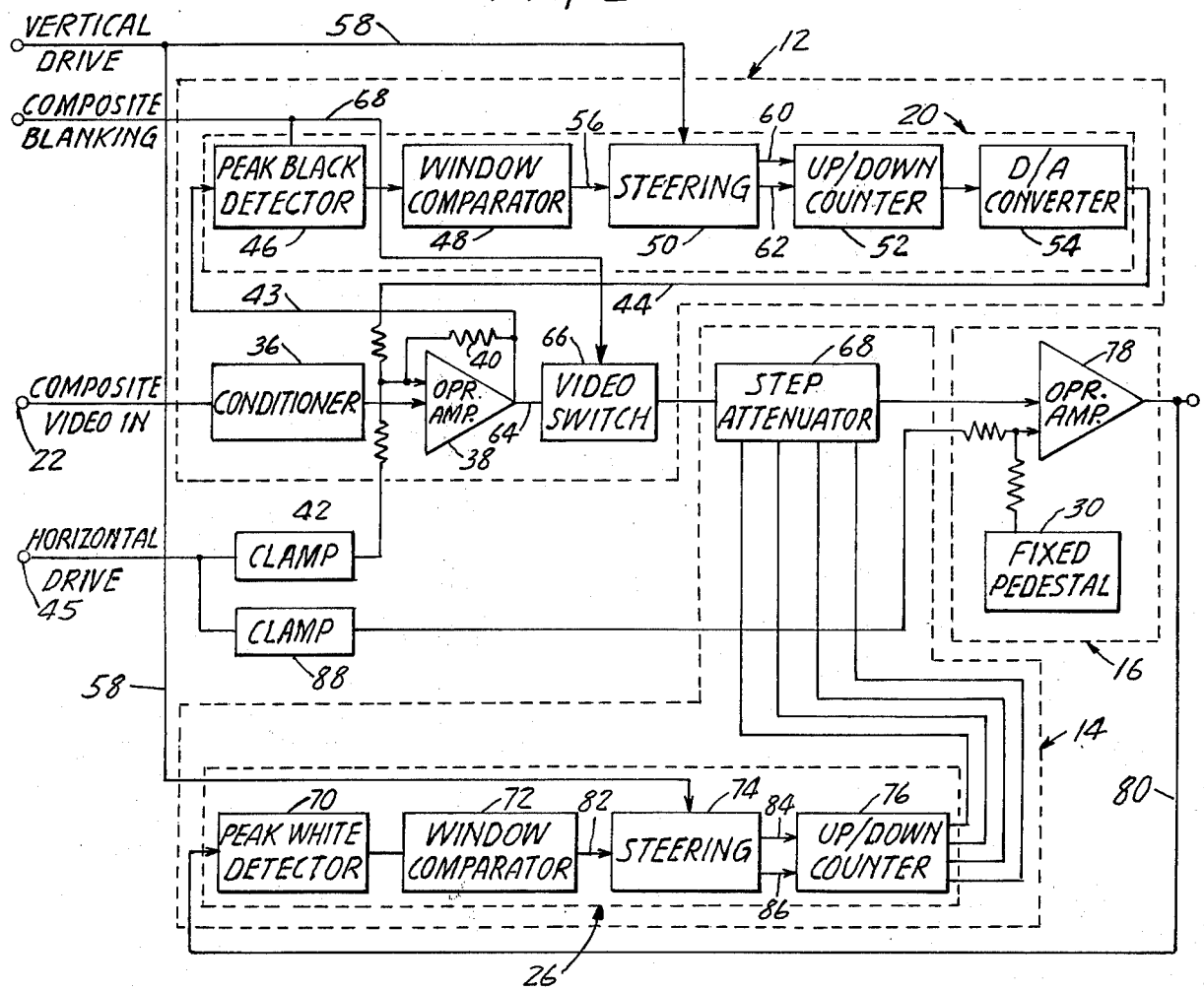
FIG. 2 is a detailed block diagram of a preferred embodiment of such a video compensation network.

The block diagram of the video compensation network shown in FIG. 2 similarly includes the three basic functional blocks shown in FIG. 1, i.e., a pedestal adjustment circuit 12, a video gain adjustment circuit 14 and a pedestal reinsertion circuit 16. In the preferred embodiment shown in this figure, the pedestal adjustment circuit 12 includes a conditioner circuit 36 for receiving an incoming composite video signal at terminal 22. The conditioner circuit 36 may be a conventional variable gain amplifier to allow the gain of the incoming signals to be arbitrarily adjusted to a desired level such that the signals fall within the dynamic range of the remainder of the network. The thus conditioned signals are coupled to a dual input operation amplifier 38, the gain of which is controlled by a feedback resistor 40 coupled between the output and one input thereof. A clamp circuit 42 triggered by a horizontal drive signal provided at terminal 45 provides a signal to the amplifier 38 to ensure that the level of a feedback signal provided at one input terminal to the operational amplifier 38 is at ground potential. Such a circuit functions much in the same manner as a conventional DC restorer circuit.

One output from the operational amplifier 38 is utilized as the input 43 to the feedback loop formed by the pedestal detector and digital correction network 20, the output of which at terminal 44 is fed back to an input to the operational amplifier 38.

The pedestal detector and digital correction network 20 is shown in FIG. 2 to include a peak black detector 46, a window comparator 48, a steering network 50, an up/down counter 52 and a digital to analog converter 54, each of which devices are of conventional design.

In operation, a video signal appearing at terminal 43 passing into the peak black detector 46 is sensed and the peak black level, i.e., pedestal level, thereof detected. The window comparator 48 is designed to pass signals having an amplitude falling within a predetermined voltage range. Accordingly, there is provided on lead 56, which is shown symbolically as a single lead, signals indicative as to whether the detected peak black signal is greater than, less than or within the predetermined voltage range. The signals on lead 56 are then coupled to a steering network 50 which acts on a vertical drive signal on lead 58 such that steering signals on leads 60 and 62 corresponding to an up, down or zero direction are produced once each video field, i.e., upon the occurrence of a vertical sync pulse. These steering signals are coupled to the up/down counter 52 and cause it to count once per field in the appropriate sense to either increase, decrease or hold the count within the counter to correspond to the extent to which the incoming peak black signal differs from the predetermined voltage range. The digital output of the up/down counter 52 is coupled to the digital to analog converter 54 to produce an analog signal corresponding to the digital signal. The analog signal is coupled via lead 44 to the input to the operational amplifier 38 to complete the first feedback loop.

Preferably, the up/down counter 52 is a 64-step counter which thereby provides 64 evenly spaced pedestal corrections, one step at a time. Since the processed composite signal produced at the output of the operational amplifier 38 may vary considerably, the least significant amount of pedestal insertion to be provided must accommodate the lowest level to be encountered. The preferred 64-step up/down counter is capable of providing an 8% change per step at the 5 to 1 overall variation range desirably accommodated. The pedestal insertion can cycle over this entire range in 64 fields, or in slightly over 1 second. By feeding back into the input of operational amplifier 38 a signal corresponding to the amount of difference between the desired window level and the sensed or detected peak black level, it may be seen that the resultant pedestal of the video signal appearing at the output of the operational amplifier 38 is reduced to zero and the peak black level is approximately at ground potential.

This processed video signal is then coupled via lead 64 to a video switch 66, which switch is triggered by a composite blanking signal supplied at terminal 68 to strip the sync pulses from the processed signal and thereby provide a stripped video signal having the desired zero pedestal level.

The output from the video switch 66 is coupled to the video gain adjustment circuit 14. This circuit includes a step attenuator network 68 together with the peak white detector and digital correction network 26, which network comprises a peak white detector 70, a window comparator 72, a steering network 74 and an up/down counter 76. The output of the step attentuator 68 is coupled to a dual input operational amplifier 78 of the pedestal insertion network 16, the output of which is coupled as a second feedback loop on lead 80 to the peak white detector 70. In this manner, the maximum excursion of the active portion of the video signal appearing at the output of the operational amplifier 78 is sensed by the peak white detector 70 and this level is then compared by the window comparator 72. The comparator 72 is designed to pass signals the voltage of which lies within a predetermined voltage range, and thus provides at an output 82 signals is greater than, less than or within the predetermined range established by the window comparator 72. The signals on lead 82 are coupled to the steering network 74 which is activated by the vertical drive signal on lead 58 so as to pass signals corresponding to the drive signals on lead 84 and 86 to the up/down counter 76. The up/down counter 76 is preferably provided with a 16-step capability. The window comparator 72 is designed to have a predetermined acceptance range so as to sense increments in the peak white level corresponding to approximately 1 db steps. A zero or one db correction each field is thus provided at the output of the up/down counter 76 and is coupled back to the step attenuator 68. Thus, if the detected peak white level lies above the predetermined voltage range set by the window comparator 72, the up/down counter 76 counts once per field in the sense to reduce the peak white level. If it lies within the window the state of the up/down counter is not changed, and if it lies below the window, the up/down counter 76 counts once per field in the sense to increase the level. If after reaching zero count, i.e., counting down, or maximum count, i.e., counting up, the level is still outside the window, the up/down counters are preferably inhibited from going "below zero" count by detecting the zero or maximum count condition and inhibiting the appropriate up or down count. Thus, if the counter is at zero, the counter can only count up, while if the counter is at maximum, the counter can only count down, thereby avoiding the recycling which would otherwise occur if either of those barriers are passed. With an insufficient video level, the attenuation is reduced to zero and the video gain will remain at maximum until the input level rises to lie within the control range. Likewise, with an excessive amplitude video input, maximum attenuation is inserted until the input level drops to within the control range.

The pedestal reinsertion circuit 16 further includes a source of fixed pedestal signals 30 which is added together with the properly attenuated video signal at the inputs to the operational amplifier 78.

Figure 3A:
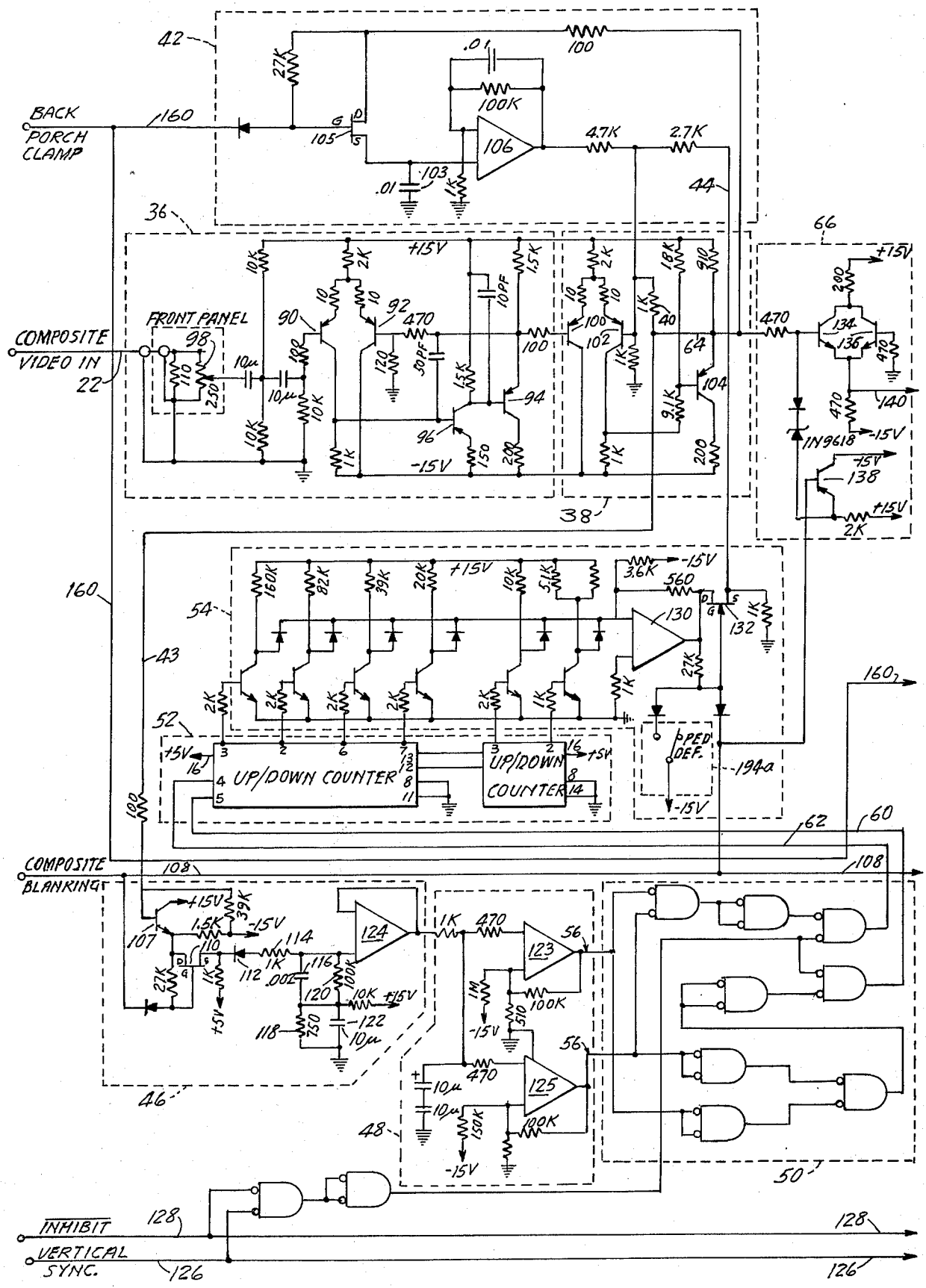
FIG. 3 is a detailed schematic diagram of the network shown in FIG. 2.
Figure 3B:
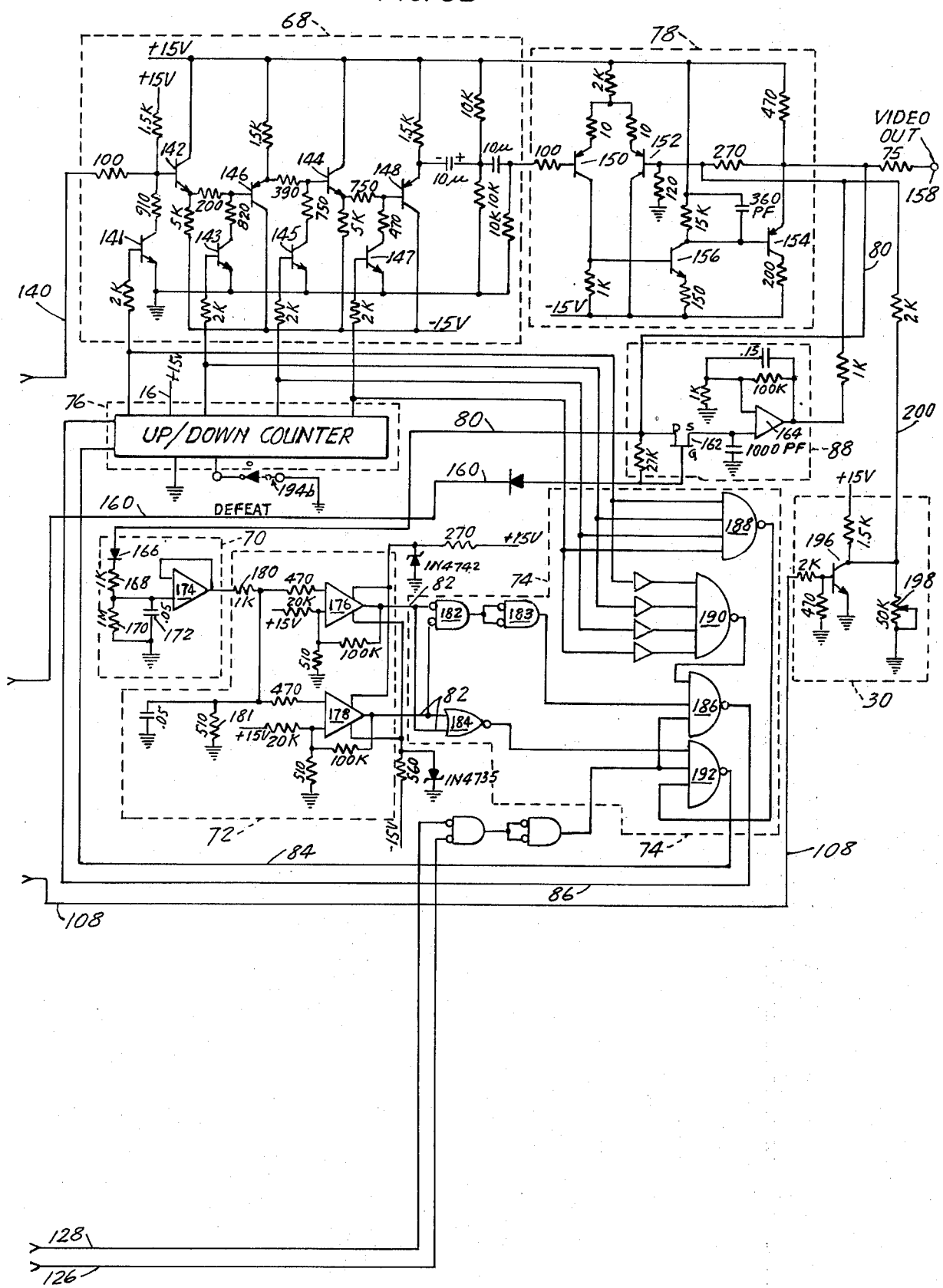

In the detailed schematic of the preferred embodiment shown in FIGS. 3A and 3B, the conditioning network 36 is shown to comprise a four-stage preamplifier including transistors 90, 92 and 94 (types 2N4917) and 96 (type 2N3565), which transistors are coupled in a conventional manner. The gain of this preamplifier is controlled by the setting of the variable resistor 98, which may be mounted on the front panel of the compensation network.

The output of the conditioning network 36 is coupled to the operational amplifier 38, which amplifier comprises transistors 100, 102 and 104 (types 2N4917) which are coupled in a conventional manner together with feedback resistor 40 to provide to DC coupled output at leads 43 and 64, respectively. The output at lead 64 is coupled to the input of a clamp circuit 42 together with a back porch clamp signal on lead 160, such as may be derived from the horizontal sync. The clamp circuit 42 includes an FET 105 (type U1897), the output of which controls the voltage across capacitor 103 to in turn control the operational amplifier 106. The output of that operational amplifier provides a DC voltage which is coupled into the base of transistor 102 to thereby drive the level of the output of the operational amplifier 38 at approximately 0 volts during the back porch interval.

The output of the operational amplifier 38 on lead 43 is coupled to the peak black detector 46 as a part of the first feedback loop. This detector comprises a transistor 107, the output of which is gated in response to a composite blanking signal on lead 108 such that information is removed during the blanking pulse intervals. The gated signal is coupled through the FET 110 (type U1897) whereupon the peak black level is detected by the circuit formed by diode 112, resistors 114, 118 and 120 and capacitors 116 and 122. The output of the detector is passed into a buffer amplifier formed by operational amplifier 124 and the output thereof passed to the window comparator 48. The operational amplifier 124 is preferably a standard integrated circuit amplifier type 741.

The window comparator 48 comprises a pair of comparator amplifiers 123 and 125 respectively, such as integrated circuit types 710, one input to each amplifier being coupled to the output of the buffer amplifier 124 of the peak black detector 46. The other input to each of the comparator amplifiers 123 and 125 is coupled through an appropriate bias network to provide a 25 millivolt window centered about ground potential. The outputs of the comparator amplifiers 123 and 125 appearing at leads 56 thus provide an indication as to whether the detected peak black signal is greater than, less than or within the window established by the window comparator 48.

The outputs on leads 56 are coupled to the steering network 50. This network comprises a network of integrated circuit NAND gates such as dual negated input AND gates type 7400 which are controlled by the inputs on leads 56, by a vertical sync signal on lead 126 and by an inhibit signal on lead 128. The latter signal is provided from associated circuits designed to ensure that the incoming signal is of an appropriate amplitude such that the automatic pedestal and gain corrections may be performed. These respective signals are readily obtained from associated video signal processing equipment. The inhibit signal may desirably be manually activated so as to hold the gain settings constant for as long as desired, such as when the received signal is sufficiently "bad" that there is no point in continuing to operate, or such as when there is prior knowledge of an on-coming signal the gain of which is desirably maintained constant. To defeat the automatic pedestal adjust or the automatic gain adjust, the defeat switches 194a or 194b may be activated to defeat pedestal insertion or hold the up/down counter at zero count. Accordingly, upon the occurrence of a vertical sync pulse on lead 126 and the presence of an inhibit signal on lead 128, the steering network 50 provides a digital up, down or zero pedestal control signal on leads 60 and 62 corresponding to the output from the window comparator on lead 56. These digital signals are coupled to the up/down counter 52, which counter comprises a pair of integrated circuit counters preferably of the integrated circuit types 74193.

The output of the counter is coupled to the digital to analog converter 54 which provides a 64-step digital to analog (D/A) conversion and reinserts a correction pedestal to the operational amplifier 38, 20 millivolts per step, which steps are provided at the vertical rate corresponding to the vertical sync pulses provided on lead 126. Each digit of the respective outputs from the up/down counter 52 is summed in operational amplifier 130, the output of which is coupled through an FET 132 (type U1897) and lead 44 as the first feedback signal. The FET 132 is triggered by a composite blanking signal on lead 108 so as to key the output of the D/A converter 54 into the operational amplifier 38 during the unblanking intervals.

The output of the operational amplifier 38 at lead 64 is coupled into the video switch 66, which switch removes the sync pulses by gating transistors 134 and 136, which transistors are in turn triggered by transistor 138 in response to a composite blanking signal on lead 108.

The output from the video switch on lead 140 is thus a stripped video signal having zero pedestal and a peak black level at substantially ground potential. This signal is coupled to the input of the step attenuator 68 of the video gain adjustment circuit 14. This attenuator comprises four DC coupled transistors 142 and 144 (type 2N3565) and 146 and 148 (type 2N4917) respectively, each of which transistors is driven through a matching transistor 141, 143, 145 and 147, respectively (type 2N3565) by the output from an up/down counter 76. This counter, like that of the up/down counter 52 of the pedestal adjustment network, is preferably an integrated circuit device such as type 74193. Depending upon the digital signal thus received into the step attenuator 68, the gain of the incoming stripped video signal is automatically controlled over a nominal 16 db range in response to the second feedback signal 80 coupled from the output of the operational amplifier 78 through the remainder of the gain adjustment network. Within the step attenuator 68, transistor 141 modifies the drive to transistor 142 and thus provides for 1 db attenuation, transistor 143 modifies the drive to transistor 144 and provides for 2 db of attenuation, transistor 145 modifies the drive to transistor 146 and provides 4 db attenuation, and transistor 147 modifies the drive to transistor 148 to provide 8 db of attenuation.

The output from the step attenuator 68 is coupled directly to the operational amplifier 78, which comprises four transistors 150, 152 and 154 (type 2N4917) and 156 (type 2N3565), which transistors are connected in a conventional manner to provide a gain of 1.5 X to a terminated line. The output from the operational amplifier 78 is coupled to an output terminal 158. The second feedback signal on lead 80 is coupled to a clamp circuit 88 and to the peak black detector 70. The clamp circuit 88 is thus driven by the output signal on lead 80 together with the signal on lead 160 from the back porch clamp input. The clamp 88 comprises an FET 162 (type U1897) which drives the operational amplifier 164 (integrated circuit type 741) to provide at the output thereof a DC voltage which is coupled back to the base of transistor 152 in the operational amplifier 78 to maintain the output thereof at ground potential.

The detector 70 includes a diode 166, resistors 168 and 170, and capacitor 172, which act to detect the weighted video white level. This detected level is coupled through a buffer amplifier 174 comprising an operational amplifier integrated circuit type 741. The output of the buffer amplifier 174 is coupled to the window comparator 72. As in the pedestal adjustment network, the window comparator 72 comprises a pair of comparator amplifiers 176 and 178 such as integrated circuit types 710. One input of the comparator amplifiers is coupled directly to the output of the buffer amplifier 174 while the other input to each of the comparator amplifiers 176 and 178 is coupled through a resistor network to provide a switching level of 0.375 and 0.415 volts respectively, thus providing a 0.040 volt window centered at 0.395 volts. The attenuator action provided by resistors 180 and 181 respectively scales this action to an equivalent window of 0.1 volt centered on a nominal 1.0 volt incoming signal. The window comparator 72 thus provides a down signal if the incoming signal is in excess of 0.415 volts, an up signal if the incoming signal is less than 0.375 volts and a zero signal if the incoming signal is between 0.375 and 0.415 volts respectively. The output signals on leads 82 are coupled to the steering network 74.

The network 74 includes NAND gates 182 and 183 (type 7400) and NOR gate 184 (type 7402), the outputs of which are coupled to a quad input NAND gate 186 such as integrated circuit type 7440. This gate is also driven in response to the vertical sync signal and inhibit signal on leads 126 and 128 respectively. Additional quad input NAND gates 188 and 190 (type 7440) are driven via the output from the up/down counter 76 to prevent the production of an up or down signal on leads 84 and 86 if the gain of the incoming signal is such that the up/down counter is providing for zero or maximum attenuation respectively. The outputs of these NAND gates 188 and 190 are coupled to an additional NAND gate 192 (type 7440) and the output thereof, together with the output of NAND gate 186, is utilized to provide the up/down signals on leads 84 and 86, which signals are coupled to the up/down counter 76.

The output of the up/down counter 76 thus controls the stepping of the step attenuator 68 in 1 db steps with an attenuation range of 0 to 15 db. This action is limited to a change in level of 0 or ± 1 db per field. The circuit increases or decreases the attenuation one db per field until the video level is such that the detected level falls within the window establised by the window comparator 72, at which time the stepping action ceases. Switch 194 allows the action of the up/down counter 76 to be defeated, thus preventing the AGC action in the absence of a composite sync signal. Switch 194 allows the counter to be held at zero count and thus removes all attenuators from the video path. The thus selectively attenuated video signal provided at the output of the operational amplifier 78 is further modified by the pedestal reinsertion circuit 30, which is driven by a composite blanking signal on lead 108. This circuit includes a transistor 196 (type 2N3565) and a variable resistor 198, which resistor may be adjusted to provide a desirable potential at the emitter of transistor 196 so as to establish a desired pedestal height. This signal is coupled back into the operational amplifier 78 on lead 200 such that the compensated composite video output is produced on output terminal 158.

Having thus described the present invention, what is claimed is:

1. A video compensation network for automatically adjusting a received composite video signal comprising
    pedestal adjustment means having a feedback loop for processing a composite video signal to automatically maintain the pedestal level of a thus processed composite video signal at a desired pedestal level, and
    video gain adjustment means having a feedback loop for automatically maintaining the peak white level of said processed composite video signal at a desired level,
    the improvement wherein
    said pedestal adjustment means comprises
        a. means for detecting the pedestal level of said processed video signal,
        b. means activated by a vertical sync signal associated with said received composite video signal for comparing said detected pedestal level with a desired pedestal level to produce a digital pedestal control signal which is adjusted not more than one increment once each video field, and for producing a first feedback signal corresponding to said pedestal control signal, and
    means for combining said first feedback signal together with said received composite video signal to produce as a said processed video signal a stripped video signal having a zero pedestal level and a peak black level at approximately ground potential, wherein
    said video gain adjustment means comprises
    means for detecting the peak white level of said processed video signal,
    means activated by said vertical blanking signal for comparing said detected peak white level with a desired peak white level to produce a digital gain control signal which is adjusted not more than one increment each video field, and for producing a second feedback signal corresponding to said gain control signal, and
    means for further processing said processed video signal in response to said second feedback signal such that the maximum excursion of said processed signal is automatically maintained within a predetermined range, and wherein
    said network further comprises means for adding blanking pulses having a predetermined amplitude to said automatically maintained processed video signal to provide a compensated composite video signal in which the pedestal level and video gain may each be independently automatically adjusted upon each vertical blanking pulse.

2. A video compensation network according to claim 1, further comprising means for indefinitely freezing the automatically adjusted pedestal level and video gain.

3. A video compensation network according to claim 1, wherein said pedestal level comparison means comprises means for comparing said detected pedestal level with a reference pedestal level corresponding to zero pedestal level to generate a pedestal drive signal corresponding to the difference therebetween, a pedestal drive steering network for providing an incremental digital pedestal control signal corresponding to said pedestal drive signal upon each vertical sync pulse, means for counting each increment of said pedestal control signal to provide a digital count corresponding to said difference in pedestal levels, and means for converting said digital count into an analog counterpart thereof.

4. A video compensation network according to claim 3, wherein said pedestal level comparison means comprises a window comparator network for producing as a said pedestal drive signal an up, down or zero pedestal control stepping signal depending upon whether said detected pedestal level is less than, greater than or within a predetermined voltage range centered about a potential corresponding to a zero value pedestal level.

5. A video compensation network according to claim 3, wherein said pedestal drive steering network comprises a plurality of logic gates activated by said pedestal drive signal and by a vertical sync component of said vertical blanking signal for coupling a single up, down or zero pedestal stepping signal to said counting means once each video field.

6. A video compensation network according to claim 3, wherein said counting means comprises an up/down counter for counting in either ascending or descending order to accumulate said digital count.

7. A video compensation network according to claim 6, wherein said up/down counter has a 64-count capability.

8. A video compensation network according to claim 3, wherein said digital converting means comprises a digital to analog converter having a plurality of inputs for receiving said digital count, having means for summing an analog voltage corresponding to that present at each input, and having means triggered by a composite blanking signal for keying said first feedback signal.

9. A video compensation network according to claim 1, wherein said peak white level comparison means comprises
    means for comparing said detected peak white level with a reference white level corresponding to a desired peak white level to generate a white level drive signal corresponding to the difference therebetween, a peak white drive steering network for providing an incremental digital peak white control signal corresponding to said white level drive signal upon each vertical sync pulse, and means for accumulating each increment of said peak white control signal to provide a digital signal corresponding to said difference in peak white levels, which digital signal represents said second feedback signal.

10. A video compensation network according to claim 9, wherein said peak white level comparison means comprises a window comparator network for producing as a said white level drive signal an up, down or zero white level control stepping signal depending upon whether said detected peak white level is less than, greater than or within a predetermined voltage range centered about a potential corresponding to a desired peak white level.

11. A video compensation network according to claim 9, wherein said peak white drive steering network comprises a plurality of logic gates activated by said white level drive signal and by a vertical sync component of said vertical blanking signal for coupling a single up, down or zero white level stepping signal to said counting means once each video field during the vertical blanking interval.

12. A video compensation network according to claim 9, wherein said counting means comprises an up/down counter for counting in either ascending or descending order to accumulate said digital count.

13. A video compensation network according to claim 12, wherein said up/down counter has a 16-count capability.

14. A video compensation network according to claim 1, wherein said means for further processing said processed video signal in response to said second feedback signal comprises means responsive to a digital second feedback signal for incrementally attenuating the gain of said stripped video signal.

15. A video compensation network according to claim 14, wherein said incremental attenuation means comprises a step attenuator having a 16-step attenuator responsive to said digital second feedback signal to step wise attenuate said stripped video signal one db per step.

16. A video compensation network according to claim 1, wherein said means for adding blanking pulses comprises means for producing blanking pulses having a predetermined pedestal level and the same phase as the original blanking pulses, and means for combining said predetermined amplitude blanking pulses with said automatically maintained processed video signal to produce a compensated composite video signal in which the amplitude of the peak white portion of the video signal and the pedestal level of the blanking pulses are each within predetermined limits.

17. A video compensation network for a composite video signal comprising a. a means for removing blanking pulses from said composite signal including.

means for adjusting the average level of said composite signal to condition the signal such that the average level falls within the dynamic range of the network, means coupled to receive said conditioned signal and adapted to be triggered by a composite blanking signal for detecting the pedestal level associated with said conditioned signal during non-synchronization periods.

window comparator means for producing an up, down or zero pedestal stepping signal depending upon whether said detected pedestal level is less than, greater than or within a predetermined voltage range centered about a potential corresponding to zero value pedestal level, means for receiving vertical blanking pulses for passing a single said up, down or zero stepping signal upon the occurrence of each vertical blanking pulse, up/down counter means for producing a digital output signal, each increment of which corresponds to a single up or down pedestal stepping signal, means for converting said digital output signal to a corresponding analog signal, means for adding said analog signal and a DC reference potential to provide a DC referenced pedestal cancellation signal the amplitude of which is equal to the pedestal level in said composite signal, means for inverting and differentially comparing said pedestal cancellation signal with said composite signal to provide a partially stripped video signal wherein the pedestal level is reduced to zero thereby substantially removing said blanking pulses, and means for blocking a said partially stripped video signal in response to a composite blanking signal to provide a fully stripped video signal;

b. means for automatically adjusting the gain of said fully stripped video signal including means responsive to an incremental digitized feedback signal for incrementally attenuating said stripped video signal, means responsive to the output from said incremental attenuation means for detecting the peak white level of a said stripped video signal provided at said output, window comparator means for producing an up, down or zero gain control stepping signal depending upon whether said detected peak white level is greater, less or within a predetermined range, means for receiving a vertical blanking pulses for passing a single up, down or zero gain control stepping signal upon the occurrence of each vertical blanking pulse, and another up/down counter means for producing as an output signal said incremental digitized feedback signal, each increment of which corresponds to a single up or down gain control stepping signal to cause the amplitude of said output from said incremental attenuation means to be automatically incrementally increased or decreased; and c. means for inserting pulses onto said gain adjusted stripped video signal, which inserted pulses have a pedestal level within a predetermined range including means coupled to receive a composite blanking pulse signal for providing a train of blanking pulses having a pedestal level within said predetermined range, means for adding train of blanking pulses and a DC reference potential to provide a train of DC referenced blanking pulses having said pedestal level within said predetermined range, and means for summing said train of DC referenced blanking pulses and the output from said incremental attenuation means to provide a compensated composite video signal wherein the pedestal level and video gain may each be independently automatically adjusted within predetermined limits.

* * * * *

UNITED STATES PATENT AND TRADEMARK OFFICE
CERTIFICATE OF CORRECTION

PATENT NO. : 3,970,777
DATED : July 20, 1976
INVENTOR(S) : Robert S. Bradford and Peter Amass It is certified that error appears in the above-identified patent and that said Letters Patent are hereby corrected as shown below:

Column 5, line 47, after "signals" insert -- indicative of whether the detected peak white signal --;

Column 6, line 4, before "count" (first occurrence) insert -- or "above maximum" --;

Column 11, line 68, change "." to -- , --;

Column 12, line 42, after "receiving" delete "a".

Signed and Sealed this

Second Day of November 1976

[SEAL]

Attest:

RUTH C. MASON
*Attesting Officer*

C. MARSHALL DANN
*Commissioner of Patents and Trademarks*